United States Patent [19]
Vandenbelt et al.

[11] Patent Number: 5,969,974
[45] Date of Patent: Oct. 19, 1999

[54] CURRENCY CONVERTER

[75] Inventors: Rudy Anthony Vandenbelt, Ottawa, Canada; Troy Gene Anderson, Marblehead, Mass.

[73] Assignee: Headwaters Research & Development, Inc., Ottawa, Canada

[21] Appl. No.: 08/964,490

[22] Filed: Nov. 5, 1997

[51] Int. Cl.⁶ .................................................. G06K 7/00
[52] U.S. Cl. ..................... 364/705.01; 235/435
[58] Field of Search ......................... 364/705.01; 235/435

[56] References Cited

U.S. PATENT DOCUMENTS 5,515,031   5/1996   Perriara .................................. 235/435

OTHER PUBLICATIONS

Currency Ecchanger; Magellan's product Brochure; Feb. 6, 1998.

*Primary Examiner*—Harold I. Pitts

[57] ABSTRACT

A currency converter operable in program, convert and calculator modes enables operators in program mode to store multiple foreign exchange rates in a data table of pre-stored currencies, enables in convert mode to perform both multiple, single-currency conversions as well as cross-currency conversions, and enables in calculate mode to perform arithmetic and memory functions passing computations seamlessly between convert and calculator modes. The currency converter is compact enough to comfortably fit in pocket or purse, and is battery powered. The currency converter includes a dual currency display that provides intuitively transparent operation substantially free from data entry errors and that allows users to select, and to see, two relevant currencies, home and foreign, or foreign and foreign, at the same time. Relevant foreign exchange rates may be entered prior to travel, freeing the user from on-site use anxieties.

14 Claims, 5 Drawing Sheets

FIG. 1

| FROM | GO/= | INTO |
|---|---|---|
| 1 | 2 | 3 |
| 4 | 5 | 6 |
| 7 | 8 | 9 |
| 0 | . | ON/C |

CURRENCY CONVERTER

FIELD OF THE INVENTION

This invention is drawn to the field of calculating machines, and more particularly, to a novel currency converter.

BACKGROUND OF THE INVENTION

During travel and in other situations, it is common practice to convert the prices of goods and services expressed in a foreign currency into one's own home (or other) currency. To obtain the equivalent value in one's own currency, the foreign price is multiplied by the home currency/foreign currency exchange rate either mentally, manually with pencil and paper, or with the aid of a portable electronic calculator While currency conversion is simple in principle, complications all too frequently have arisen in practice. The mental calculation technique is subject to computational error, particularly where the price is large and/or the exchange rate is an unruly decimal or ratio. In addition, the mental calculation technique always calls for a modicum of concentration, and mental stress may be introduced, particularly where the situation is "busy" or otherwise does not readily allow the mental calm necessary to perform the calculation.

The manual calculation technique is also subject to human calculation error, and suffers the further disadvantages that even when pencil and paper are readily available, the time and effort involved in performing the calculations may be experienced as disruptive, and may heighten the sometimes uncomfortable feeling of being in a foreign land far from home.

While free from computation error, the use of a calculator is encumbered by the need to remember, and to enter, the exchange rate separately for each price conversion. In addition, the situations where each conversion is to be calculated are often such as to disturb mental calm, and anxieties may arise either from worry that the correct form of the exchange ratio has been entered or that the calculation has been accurately performed.

Calculators pre-programmed to do currency conversion have been devised in the effort to help alleviate these difficulties. The single-foreign/single-home currency exchanger commercially available from Magellens™ is representative of this class of devices. In use, the exchange rate to be employed is first manually entered and stored in the currency exchanger, and thereafter, each foreign price is entered and the currency exchanger automatically converts it to the home currency.

The heretofore known single-foreign/single-home currency converters have been disadvantageous in multi-country travel and other situations. Not only has the old exchange rate had to be cleared and the new country's exchange rate manually entered with entry into each new country, but also it has not been practicable to perform multiple, cross-country currency conversion. Moreover, the user interfaces of the heretofore known single-foreign/single-home currency converters have generally been less than intuitive. Displaying only a numeric field, the heretofore known devices were subject to uncertain data entry, and to a lingering suspicion that somehow the conversion may have been unreliable.

SUMMARY OF THE INVENTION

It is accordingly the general object of the present invention to provide a currency converter that overcomes the disadvantages of the heretofore known single-foreign/single-home currency converters and currency conversion techniques.

It is another object of the present invention to provide a currency converter that calculates multiple foreign currency conversion without having to reprogram the device for each new foreign currency.

It is another object to provide a currency converter capable of cross-country and multiple, single-country conversion without memory or pencil and paper aids.

It is another object of the present invention to provide a currency converter that is easy to use, promotes mental confidence putting the operator at ease, and that frees the operator from any lingering anxieties, even in the most unsettled of situations.

In accord therewith, the currency converter of the present invention includes a multi-field reconfigurable display configurable in program mode to define from currency and numeric fields and a local currency field and configurable in convert mode to define dual from currency and numeric fields and into currency and numeric fields; a memory for storing a data table of exchange rates of multiple countries; operator input means defining from, into and numeric selections; and a processor coupled to the multi-field reconfigurable display, to the memory, and to the operator input means that is selectably operable in a program mode and in a convert mode.

In program mode, the processor is operative to configure the multi-field reconfigurable display into its convert display mode, and is operative in response to operator numeric exchange rate input and to operator from country input to store a data table in said memory in accord with the exchange rates of the countries input.

In convert mode, the processor is operative to configure the multi-field reconfigurable display into its program mode configuration, and is operative in response to operator from and into country input to display the from country input in the from field of the display, and to display the into country input in the into field of the display; is operative in response to operator numeric input to display the number entered in the from currency numeric field, which number represents the value of the goods or services to be converted; and is operative to calculate and display the equivalent value of the number entered in the into currency numeric field of the display.

In this manner, the operator is enabled in program mode to enter the exchange rates of multiple countries free from the bustle of point-of-sale transactions, such as on the plane over to the foreign destinations, thereby completely eliminating the stresses and anxieties that have attended the heretofore known devices and techniques, and is enabled in convert mode to perform multiple, single-currency conversions and cross-currency conversions without having to reenter for each single- and/or cross-currency conversion another exchange rate and without need of memory or pencil and paper aids as in the heretofore known devices and techniques. In both program and convert modes, the multi-field display allows the user to see at once all of the relevant information, rendering the operation of the device transparently intuitive, thereby achieving a level of ease of use, and operator confidence, not heretofore available.

It is another object of the present invention to provide a currency converter that seamlessly integrates arithmetic and memory functions to conversion mode operation, thereby enabling the operator to perform numeric and/or memory operations on values, such as totaling purchases or adding sales taxes and the rest, effortlessly and in a completely intuitive way.

In accord therewith, the multi-field reconfigurable display is further configurable in a compute configuration mode to define calculator and numeric fields; the operator inputs further include arithmetic function and memory function inputs; and the processor is further operable in a compute mode. In its compute mode, the processor is operative to configure the multi-field reconfigurable display into its compute configuration display mode defining calculator and numeric fields; is further operative in response to entering compute mode from convert mode to display the value of the from numeric field as operand; and after arithmetic processing and/or memory function processes are performed, is operative to transfer the value in the numeric field back in calculator mode into the from numeric field in convert mode, where it is automatically converted into ones own base currency and displayed.

In this manner, operators of the currency converter of the present invention are enabled to perform arithmetic and memory functions on foreign prices in any currency in compute mode, and to see the conversion on the result of the arithmetic or memory computations back in convert mode.

BRIEF DESCRIPTION OF THE DRAWINGS

Other objects, inventive aspects and advantageous features of the present invention will become apparent as the invention becomes better understood by referring to the following detailed description of the preferred embodiments, and to the drawings, wherein.

DETAILED DESCRIPTION OF THE PREFERRED EMBODIMENTS

Figure 1:
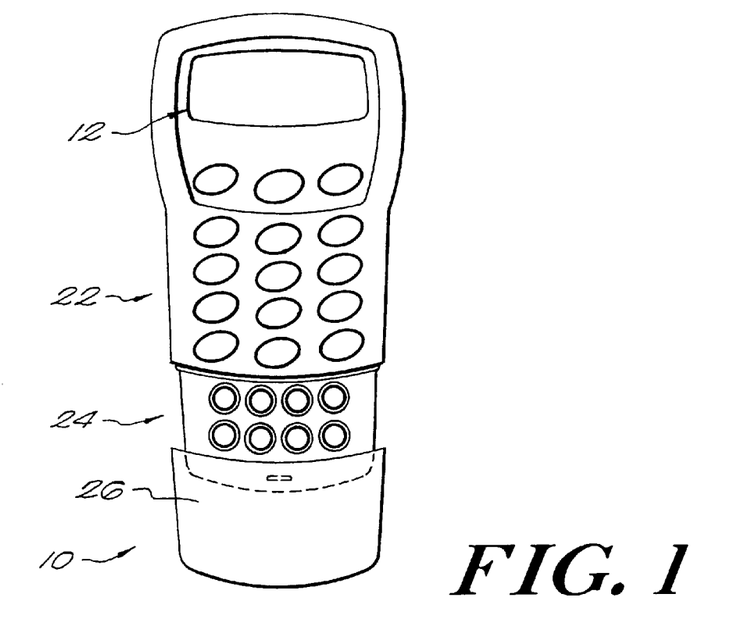
FIG. 1 is a front plan view of the novel currency converter in accord with the present invention.

Referring now to FIG. 1, generally designated at 10 is a front plan view of the portable, battery-powered currency converter in accord with the present invention. As appears more fully below, the currency converter 10 is operable in a program mode, to allow the operator to input multiple exchange rates into a data table of multiple foreign currencies; in a convert mode to enable the user to perform multiple, single-currency conversions, as well as cross-currency conversions; in a calculator mode, to allow the operator to perform arithmetic and memory functions during currency conversion; and/or in a stand-alone calculator mode.

The currency converter 10 includes a multiple-field reconfigurable display generally designated 12. In each of the program, convert and calculator modes, the screen is configured to provide at-a-glance transparent intuitability of precisely which exchange rates are being entered in program mode, which currencies are being converted into which currencies in convert mode, and what values are being manipulated. Error is thereby substantially eliminated, operator anxiety is substantially eliminated, and both ease of use and ease of sequencing are provided.

Figure 2:
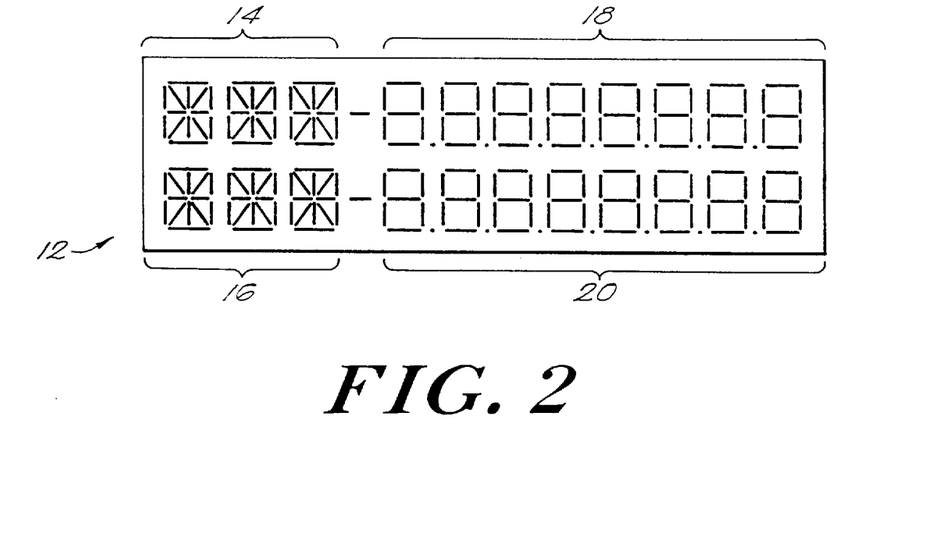
FIG. 2 is a graphical representation of the multi-field reconfigurable display of the currency converter of the present invention.

Referring now briefly to FIG. 2, generally designated at 12 is a graphical representation of the multi-field reconfigurable display of the currency converter of the present invention. The display 12 is comprised of four (4) fields schematically illustrated by brackets 14, 16, 18, and 20. The fields 14 and 16 are provided to display alphabetic characters, and the fields 18, 20 are provided to display numeric characters. As appears more fully below, in program mode, the display 12 is so configured that the alphabetic field 14 defines a from country icon field, the numeric field 18 defines a from country numeric field, the alphabetic field 16 defines the home (local) currency icon field, and the numeric field 20 is preset to one (1) as the unit value of the home or base currency. In convert mode, the display 12 is configured such that the alphabetic field 14 and numeric field 18 define from country icon and numeric fields, and the alphabetic field 16 and the numeric field 20 define into country icon and numeric fields. In calculator mode, the field 14 is not used, the alphabetic field 16 is configured to display a calculate mode icon, the numeric field 20 is not used, and the numeric field 18 is configured to display the operand for arithmetic calculations and memory functions to be described.

Returning now to FIG. 1, the currency converter 10 is provided with an operator input keypad generally designated 22 for entering from and into country selections, for entering numeric values, and for selecting and controlling modal operation. As appears more fully below, although from and into country selections are preferably implemented by toggling through the individual countries of a pre-stored, programmable data table of multiple foreign countries to be described, other selection arrangements may be employed.

Figure 3:
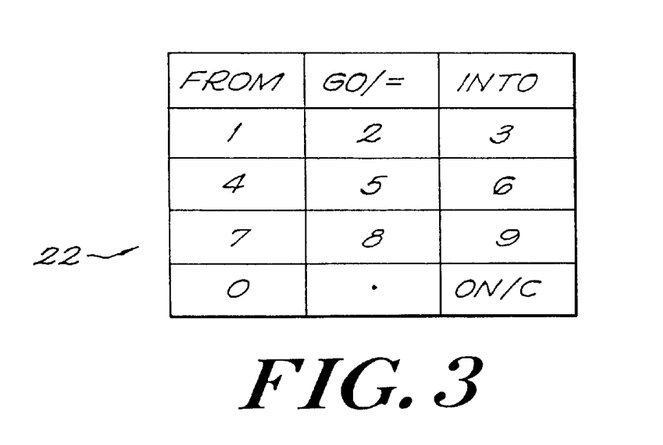
FIG. 3 is a graphical representation of the operator input keypad defining from, into and numeric selections of the currency converter of the present invention.

Referring now briefly to FIG. 3, generally designated at 22 is a graphical representation of the fifteen (15) keys of the operator country selection and control keypad.

As illustrated, the keypad 22 is arranged in a three (3) by five (5) matrix. A "FROM", a "GO/=", and an "INTO" key are provided in the top row. As appears more fully below, toggling the "FROM" key in program mode enables the operator to display different foreign currencies icons in the alphabetic field 14 (FIG. 2) whose exchange rates are to be programmed, while the "FROM" and "INTO" keys in convert mode enable the operator to select different FROM country and INTO country icons respectively in the alphabetic fields 14, 16 (FIG. 2) both for single- and multiple-currency conversion. As appears more fully below, the "GO/=" key controls mode transition; pressing the "GO" key changes from program mode back to conversion mode, while pressing and holding the "GO" key changes from conversion mode to program mode. In program mode, the "GO" key also saves in the data table of exchange rates values entered in program mode, and the "GO/=" key converts a foreign price into a selected home or other currency in conversion mode.

The keyboard also includes an "ON/C" key, ten (10) numeric keys, and a decimal point key arranged as illustrated in the bottom four rows. The "ON/C" key turns the unit "on," or clears a numeric entry in program, convert and calculate modes.

Figure 4:
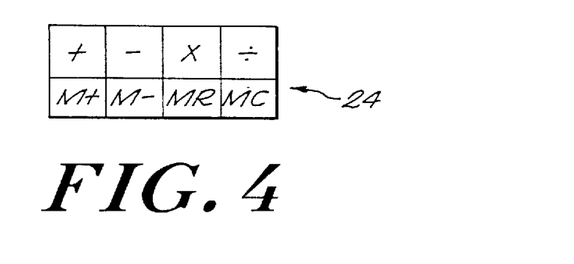
FIG. 4 is a graphical representation of the operator input keypad defining arithmetic and memory selections of the currency converter of the present invention.

Returning now to FIG. 1, the currency converter 10 of the present invention further includes an arithmetic and numeric keyboard generally designated 24. A protective door 26 slidably mounted to the converter 10 exposes the keyboard 24 and protects it when not in use. The keyboard 24 includes eight (8) keys, and as illustrated in FIG. 4, is arranged as a two (2) by four (4) matrix. In the top row, addition, subtraction, multiplication, and division keys are provided, while in the bottom row a memory add, memory subtract, memory recall, and memory clear function keys are provided.

Figure 5:
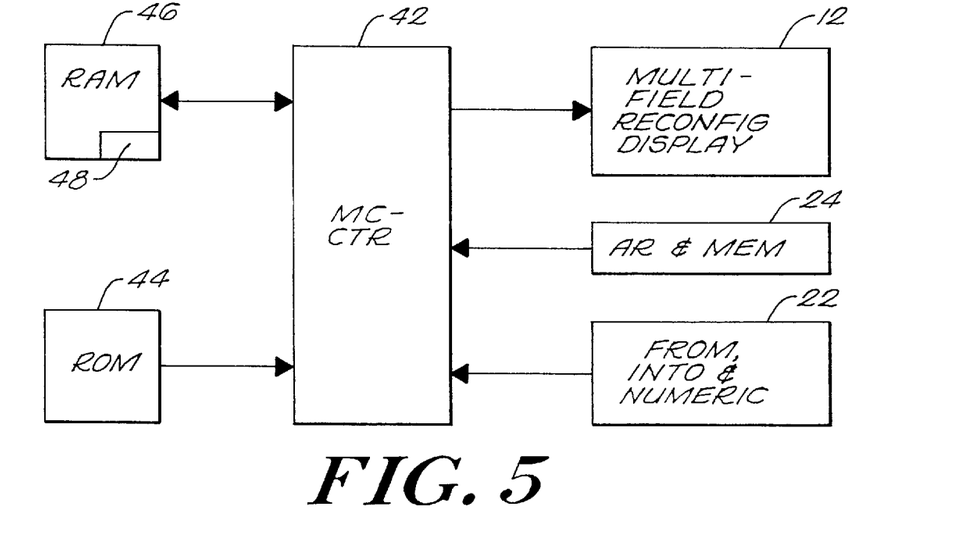
FIG. 5 is a circuit block diagram illustrating the processor of the currency converter of the present invention.

Referring now to FIG. 5, generally designated at 40 is an electrical block diagram of the currency converter of the present invention. The currency converter of the present invention includes a microprocessor 42, preferably the SHARP LI3504 microprocessor, having the usual ALU (arithmetic and logic unit), not shown. Program ROM 44 that controls operation in the program, convert and compute modes is operatively coupled to the processor 42. A random access memory RAM 46 is operatively coupled to the processor 42. The RAM 46 includes a data table schematically illustrated at 48 of exchange rates of multiple countries to be described. Preferably, the data table includes twenty (20) entries as illustrated in the table below, although a different number and a different selection of countries could be employed.

| Order | Country | Abbreviation |
| --- | --- | --- |
| 1 | United States | USA |
| 2 | Australia | AUS |
| 3 | Austria | AUT |
| 4 | Canada | CAN |
| 5 | China | CHN |
| 6 | France | FRA |
| 7 | Germany | GER |
| 8 | Greece | GRE |
| 9 | Hong Kong | HKG |
| 10 | Italy | ITA |
| 11 | Japan | JPN |
| 12 | Mexico | MEX |
| 13 | Netherlands (Holland) | NET |
| 14 | Portugal | POR |
| 15 | Russian Federation | RUS |
| 16 | Spain | SPA |
| 17 | Switzerland | SWI |
| 18 | United Kingdom | UK |
| 19 | The Euro | EUR |
| 20 | Other | OTH |

The abbreviations appear in the alphabetic fields 14, 16 (FIG. 2) during operation in convert and program modes. It may be noted that the data table includes as item order number nineteen (19) an entry designated "EUR" for the proposed European currency, as well as a user specifiable entry "OTH" for a currency other than that specifically illustrated. Three other abbreviations, not shown in the table above, are stored in the RAM 46, namely "LOC" for local currency, a "CAL" icon for displaying operation in calculator mode, and "ERR", for designating an error during operation in calculator and stand-alone modes. Specific values of exchange rates are operator input into the data table 48 in a manner to be described to allow single- and cross-country conversion of operator selected countries and currency values.

The multi-field reconfigurable display 12 is operatively coupled to the processor 42. The arithmetic and memory inputs of the keypad 24 are operatively coupled to the processor 42. The FROM, INTO and numeric inputs of the keypad 22 are operatively coupled to the processor 42.

Examples of the use of the currency converter of the invention in its program mode, convert mode, and calculate mode now follow.

Program Mode

To convert foreign currencies, the operator first enters the exchange rates for the currencies intended to be used.

The unit is started by pressing the "ON/C" button of the keypad 22 (FIG. 3).

The "GO/=" button of the keypad 22 (FIG. 3) is pressed and held for about two (2) seconds and the unit enters program mode. Upon first use, the display 12 (FIGS. 1, 2) shows the following default setting:

| | |
| --- | --- |
| USA | 1.00 |
| LOC | 1.00 |

The top row is the From row, and displays U.S.A. in the from country icon field 14 (FIG. 2) and 1.00 in the from country numeric field 18 (FIG. 2), and the bottom row is the Into field, and displays LOC in the into country icon field 16 (FIG. 2) and 1.00 in the into country numeric field 20 (FIG. 2).

For exchange rate entering purposes, "LOC" represent the base or "home" currency (i.e., the currency to which all foreign amounts are converted to). Other base currency icons may be provided. If the home currency is US Dollars, the exchange rate shown above is correct (1.00 US Dollar=1.00 US Dollar). If the home currency is some other currency (e.g., German Marks) and it is desired to enter the US Dollar/German Mark exchange rate, the equivalent value of one (1) local ("LOC") currency unit is entered in the "FROM" display numeric field 18 (FIG. 2) using the numeric keypad 22 (FIG. 3), (e.g., one (1) German Mark= 0.58 US Dollars), as shown below:

| | |
| --- | --- |
| USA | 0.58 |
| LOC | 1.00 |

To enter another exchange rate, the "FROM" button of the keypad 22 (FIG. 3) is pressed to scroll to another currency, the value of the foreign currency is entered using the numeric keys of the keypad 22 (FIG. 3), and this step is repeated for as many exchange rates as desired.

The "GO/=" button of the keypad 22 (FIG. 3) is pressed once to exit the program mode and to save all conversion values in memory 48 (FIG. 5).

The "OTH" abbreviation is used for currencies not included in the database. If a value is not entered, the default value for conversion=1.00. Previously entered exchange rates remain in memory until new exchange rates are entered.

Convert Mode

The first time the currency converter is turned on after entering the exchange rates, the following default screen appears:

| | |
| --- | --- |
| USA | 0.00 |
| USA | 0.00 |

The foreign currency to convert from is selected by pressing the "FROM" button of the keypad 22 (FIG. 3) until the desired currency icon appears.

The home currency to convert into is selected by pressing the "INTO" button of the keypad 22 (FIG. 3) until the desired currency icon appears.

The foreign purchase amount is entered in the "FROM" display numeric field 18 (FIG. 2) with the numeric keypad 22 (FIG. 3).

The "GO/=" button of the keypad 22 (FIG. 3) is then pressed once to display the converted amount in the "INTO" display numeric field 20 (FIG. 2).

For example, assume travel from the U.S. to Germany and France, and the US dollar as home (LOC) currency. On the flight overseas, for example, assuming U.S.A. as the base currency, the following exchange rates are entered.

GER to LOC=1.71

FRA to LOC=6.42

U.S.A. to LOC=1.00

Upon arriving, for example, in Paris, assume there is a need to convert a seventy nine (79) French Franc meal to US Dollars. This is accomplished as follows.

Press the "FROM" button of the keypad 22 (FIG. 3) to scroll to the FRA icon and press the "INTO" button of the keypad 22 (FIG. 3) to scroll to the U.S.A. icon.

| FRA | 0.00 |
|---|---|
| USA | 0.00 |

Using the numeric keypad 22 (FIG. 3), enter "79" into the "FROM" display numeric field 18 (FIG. 2) now marked FRA in the from display icon field 14 (FIG. 2).

| FRA | 79.00 |
|---|---|
| USA | 0.00 |

Press the "GO/=" button of the keypad 22 (FIG. 3). The "INTO" display numeric field 20 (FIG. 2) shows the converted amount in US Dollars ($12.30).

| FRA | 79.00 |
|---|---|
| USA | 12.30 |

When in Germany, for example, simply select the GER icon (by pressing the "From" key of the keypad 22) from the database and repeat the foregoing process to convert currency.

There may be times when there is the need to know the value of a foreign purchase in another foreign currency, not the home currency (e.g., to compare the price of an item in Paris with one in Frankfurt). So long as the home rate and foreign exchange rates were entered into the data table previously, cross-currency conversions may be accomplished without requiring the separate entry of new exchange rates and without the need for memory or pencil and paper aids.

For example, the conversion of the cost of a fifty-five (55) German Mark meal to French Francs is accomplished as follows.

Press the "FROM" button of the keypad 22 (FIG. 3) to scroll to the GER icon. Then press the "INTO" button of the keypad 22 (FIG. 3) to scroll to the FRA icon.

| GER | 0.00 |
|---|---|
| FRA | 0.00 |

Enter fifty-five (55) into the "FROM" display numeric keys of the 18 (FIG. 2) using the numeric keys of the pad 22 (FIG. 3).

| GER | 55.00 |
|---|---|
| FRA | 0.00 |

Press the "GO/=" button of the keypad 22 (FIG. 3). The "INTO" display numeric field 20 (FIG. 2) shows the converted amount in French Francs (FF).

| GER | 55.00 |
|---|---|
| FRA | 206.00 |

For cross-currency conversion, the currency converter of the invention calculates an extrapolated exchange rate estimate for two (2) foreign currencies when the exact exchange rates have not been entered. For example, if the US Dollar/ German Mark and US Dollar/French Franc exchange rates have been entered into the currency databank and if a German Mark price is to be converted to French Francs, the French Franc/German Mark exchange rate is estimated when it does the cross-currency calculation. For an exact conversion of foreign exchange rates, the current foreign exchange rate may be entered into the unit's currency databank (e.g., by entering the French Franc/German Marc exchange rate in program mode).

Calculator Mode

The calculator mode is particularly handy for adding up purchases, adding sales tax onto purchases, and so on. To activate the calculator mode, slide-out the protective door 26 to expose the calculator keypad 24, and press any memory (MR or MC) or mathematical function (+,−,×,÷) button. The math and memory functions are operated as follows.

For math functions, the calculator mode may be entered from convert mode, e.g., after converting a currency to add a sales tax, by depressing any one of the math keys of the keypad 24 (FIG. 4).

The converted currency display in convert mode before calculator mode, would, for example, be:

| FRR | 79.00 |
|---|---|
| USA | 12.30 |

To add a seventeen percent (17%) tax rate to the seventy-nine (79) French Franc purchase illustrated above, press the "×" button of the keypad 22 (FIG. 4) and enter 1.17 on the numeric keypad 22 (FIG. 3).

CAL 79.00

In the Calculator Mode, the INTO field screen shows "CAL" in the into field 16 (FIG. 2) to indicate that the processor is in the calculator mode. The 1.17 input via the numeric keys of the keypad 22 (FIG. 3) is displayed in calculator mode in the "From" numeric field 18 (FIG. 2).

CAL 1.17

Press the "GO/=" button of the keypad 22 (FIG. 3) to transition back to convert mode. In calculator mode, the processor saves the result of the calculation selected and, upon transition back to convert mode, displays it back in the from country numeric field 18 (FIG. 2). The French Franc purchase with seventeen percent (17%) sales tax is shown in the FROM display from country and numeric fields 14, 18 (FIG. 2), with the equivalence in US Dollars in the INTO display into country and numeric fields 16, 20 (FIG. 2).

| FRA | 92.43 |
|-----|-------|
| USA | 14.39 |

For memory functions, a number is entered into memory (e.g., in order to add up purchases).

The calculator mode is activated by pressing any math or memory function of the keyboard 24 (FIG. 4).

CAL 0.00

The number to store is input into memory (e.g., ninety-two and forth-three hundredths (92.43)).

CAL 92.43

Press the "M+" button of the keyboard 24 (FIG. 4). The number is now stored in memory. To add another number, (e.g., to add two (2) purchases together), input the new number (e.g., twenty-five (25.00)) by pressing the numeric keys of the keyboard 22 (FIG. 3).

CAL 25.00

Then press the "M+" button of the keyboard 24 (FIG. 4). The cumulative amount is then displayed.

CAL 117.43

It will be appreciated that the foregoing operations are exemplary only and that a wide variety of single- and cross-currency conversions, and arithmetic and memory operations, may be executed by use of the currency converter of the present invention.

Figure 6:
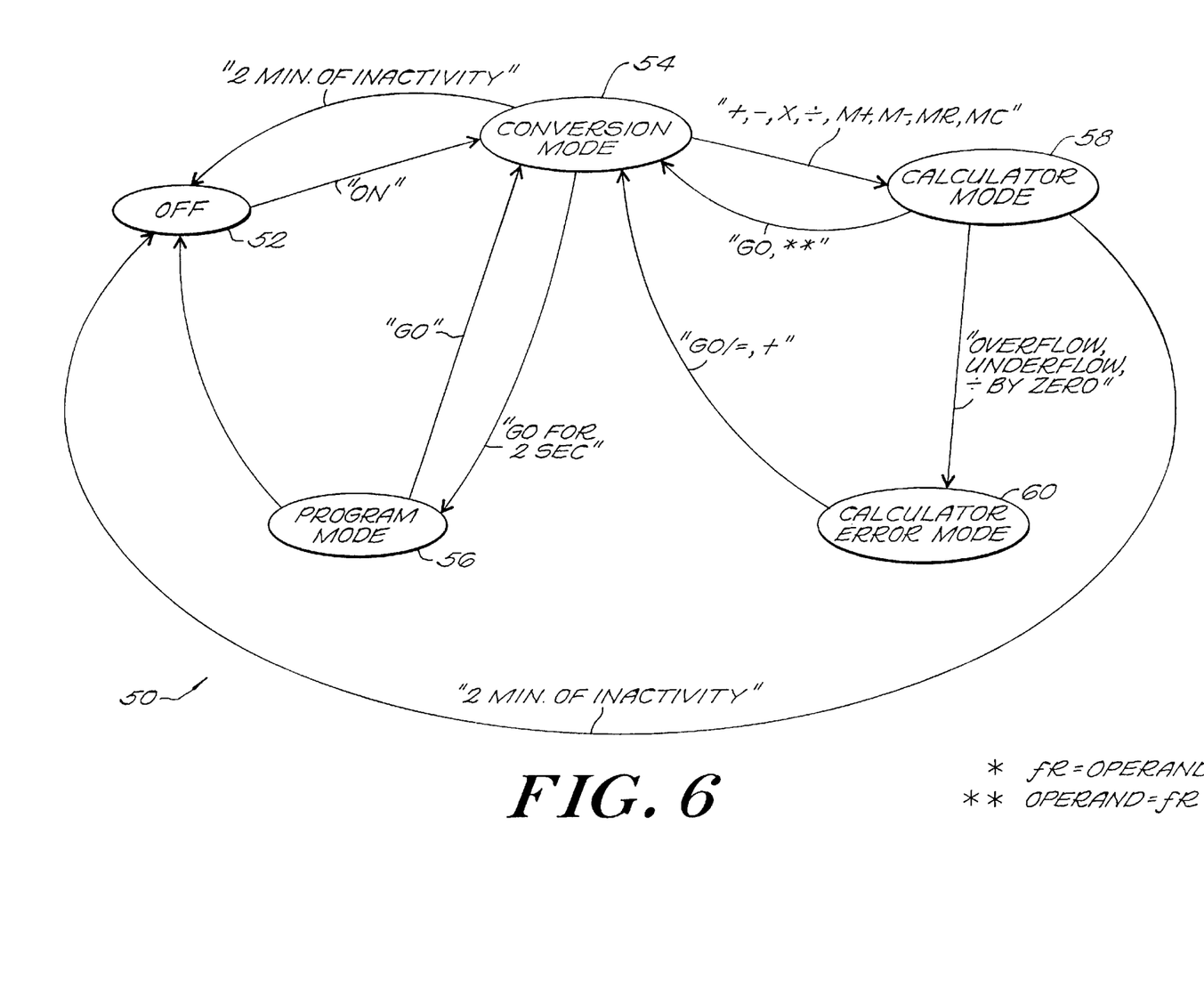
FIG. 6 is a state diagram illustrating the program, convert, and calculator modes of the processor of the currency converter of the present invention.

Referring now to FIG. 6, generally at 50 is a state diagram of the currency converter of the present invention. The states of the currency converter are indicated by an Off state 52 a Conversion state 54, a Program state 56, a Calculator state 58, and a Calculator Error state 60. As indicated by an arrow marked "ON" extending between the Off state 52 and the Conversion state 54, depressing the "ON/C" button of the keypad 22 (FIG. 3) causes the processor 42 (FIG. 5) to transition from its Off state to its Conversion mode. As indicated by the arrow extending from the Conversion mode 54 to the Off state 52, marked "2 minutes of inactivity," the processor 42 transitions to its off state whenever the indicated transition condition occurs.

As indicated by an arrow marked "Go for 2 seconds" extending between the conversion state 54 and the program state 56, the processor transitions from conversion mode to program mode whenever the "GO/=" button of the keypad 22 (FIG. 3) is depressed for more than about two (2) seconds. As indicated by the arrow marked "GO" extending between the program state 56 and the conversion state 54, the processor transitions from program mode to conversion mode whenever the "GO/=" key of the keypad 22 (FIG. 3) is depressed. As indicated by the arrow extending between the conversion state 54 and the calculator state 58 marked "+,−,×,÷, M+, M−, MR, MC," the processor transitions from its conversion mode to its calculator mode upon depressing any one of the arithmetic and memory function keys of the keypad 24 (FIG. 4). As indicated by the "*", the processor during transition from conversion to calculator modes saves the numeric value in the FROM numeric field 18 (FIG. 2) in conversion mode and displays it as the operand in the same field in calculator mode.

As shown by the arrow extending from the calculator state 58 to the conversion state 54 marked "GO,**", the processor transitions from calculator to conversion mode whenever the GO/=key of the keypad 22 (FIG. 3) is depressed. As indicated by the double star, the processor is operative when it transitions from the calculator mode to its conversion mode to save the result in the numeric field 18 (FIG. 2) in calculator mode and to display it in the from currency numeric field 18 (FIG. 3) in conversion mode.

As indicated by the arrow extending between the calculator state 58 and the off state 52 marked "2 minutes of inactivity", the processor is operative to turn itself off after two minutes of inactivity.

As indicated by the arrow extending between the calculator state 58 and the calculator error state 60 marked "overflow, underflow, ÷ by zero," the processor transitions to its calculator error state whenever calculations overflow, underflow or if there is a divide-by-zero condition. As shown by an arrow extending between calculator error state 60 and the conversion state 54 marked "GO/=, +," the processor transitions from its calculator error state to its conversion mode upon depressing either the "GO/=" or the "+" keys of the keyboard 22 (FIG. 5).

Figure 7:
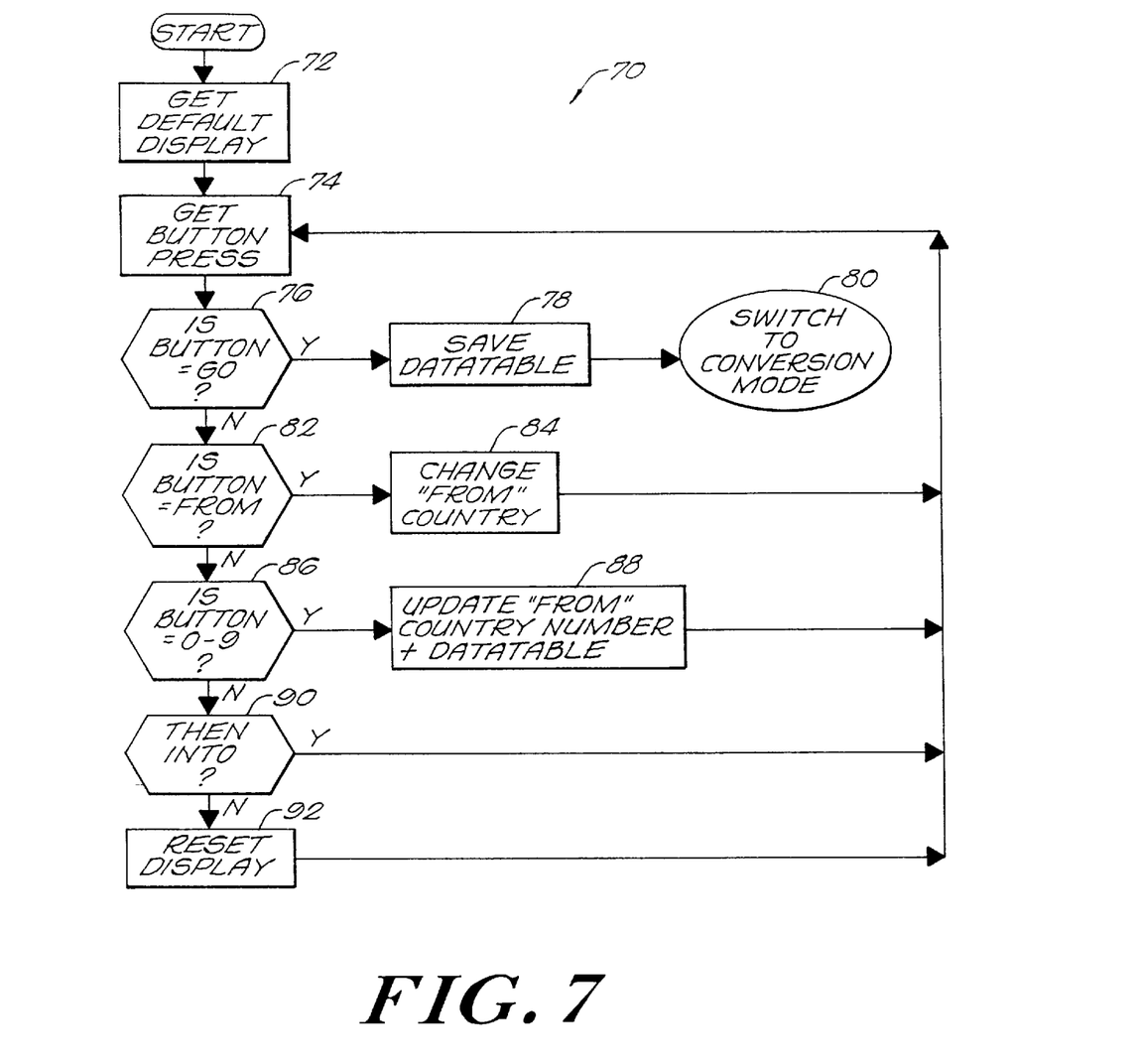
FIG. 7 is a flow chart illustrating the program mode of the processor of the currency converter of the present invention.

Referring now FIG. 7, generally designated at 70 is a flow chart of processor operation in its program mode.

As shown by a block 72, the processor in program mode is operative to configure the multi-field reconfigurable display 12 (FIG. 2) in its program mode configuration and sets the default display therefor.

As shown by a block 74, the processor is then operative to get a button pressed.

As shown by a block 76, the processor is operative to determine whether the button equals the "GO/=" button. If it is, the processor is operative to save the data table of exchange rates of one or more multiple currencies entered as shown by a block 78 and processing transitions to conversion mode as shown by a block 80.

As shown by a block 82, if the button equals the "FROM" button, the processor is operative to change the icon displayed in the from country display field 14 (FIG. 2) as shown by a block 84.

As shown by a block 86, if the button equals any of the numeric keys of the keypad 22 (FIG. 3), the processor is operative to update the number in the from numeric field 18 (FIG. 2), and to update the data table of exchange rates as shown by a block 88.

As shown by a block 90, the processor is operative if the pressed button is not the into button to reset the display as shown by a block 92 (because it is the clear key of the keypad 22 (FIG. 3)); if the into button has been pressed, processing branches to the block 74.

Figure 8:
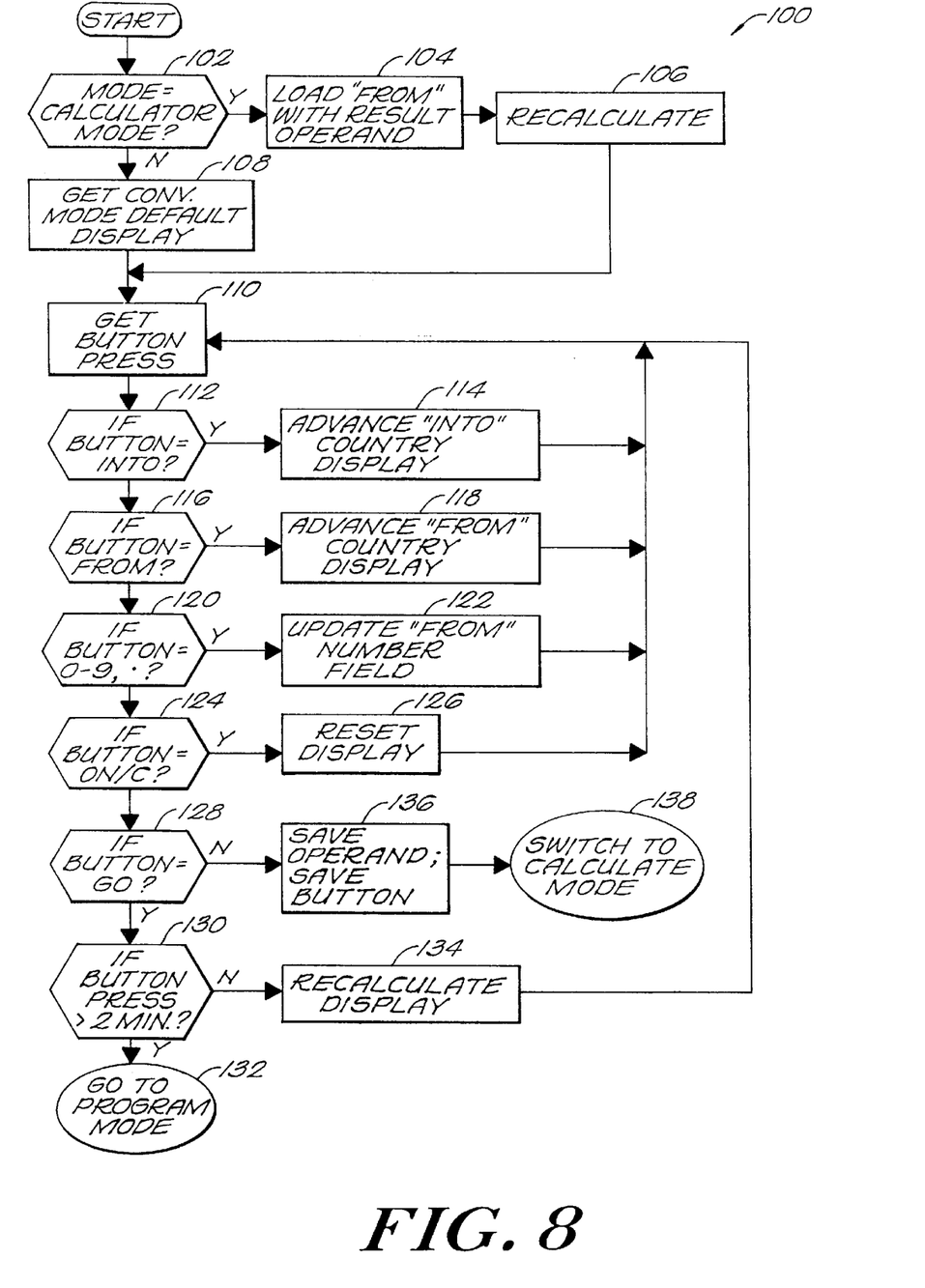
FIG. 8 is a flow chart illustrating the conversion mode of the processor of the currency converter of the present invention.

Referring now to FIG. 8, generally designated at 100 is a flow chart illustrating processor operation in its conversion mode.

As shown by a block 102, the processor is operative to determine if the prior operation state was the calculator mode. If the prior processing mode state equals the calculator mode as shown by a block 104, the processor loads the from numeric field 18 (FIG. 2) with the result value. The processor then recalculates the equivalent value using the prior conversion mode values of from and into countries and displays it in the numeric field 20 (FIG. 2) as shown by the block 106.

If the prior processing mode was not the calculating mode, the processor configures the display 12 (FIG. 2) in its conversion mode, and sets the conversion mode default display as shown by a block 108.

As shown by a block 110, the processor is then operative to get a button.

As shown by a block 112, if the button value equals the INTO key of the keypad 22 (FIG. 3), the processor is operative to advance the into country field 16 (FIG. 2) as shown by a block 114.

As shown by a block 116, if the button value equals the FROM key of the keypad 22 (FIG. 3), the processor is operative to advance the from country field 14 (FIG. 2) as shown by a block 118.

As shown by a block 120, if the button value equals one of the numeric keys or the decimal point, the processor is operative to update the from number field 18 (FIG. 2) as shown by a block 122.

As shown by a block 124, if the button value is the ON/C key of the keypad 22 (FIG. 3), the processor is operative to reset the display as shown by a block 126.

As shown by a block 128, if the button value equals the GO key of the keypad 22 (FIG. 3), the processor is then operative to determine if the button press was greater than two (2) seconds as shown by a block 130. If it is greater than two (2) seconds as shown by a block 132, processing transitions to program mode. If it is less than two (2) seconds, the processor recalculates the INTO numeric field 20 (FIG. 2) as shown by a block 134.

If the button value was not the "GO" button, the button value was one of the arithmetic or memory keys of the keyboard 24 (FIG. 4), and as shown by a block 136, the processor is operative to save the value in the from numeric field 18 (FIG. 2) as operand, to save the button value, and to save the from and into countries in the from and into alphabetical fields 14, (FIG. 2) and processing transitions to calculate mode as shown by a block 138.

Many modifications of the presently disclosed invention will become apparent to those of skill in the art who have benefitted by the instant disclosure.

What is claimed is:

1. A currency converter selectably operable in program mode to store multiple foreign currency exchange rates, and in convert mode to perform single- and cross-currency conversions, comprising:

a multi-field reconfigurable display configurable in program display mode to define from currency icon and numeric fields and a local currency icon field, and configurable in convert display mode to define dual from currency icon and numeric fields and into currency icon and numeric fields;

a memory storing a programmable data table of exchange rates of multiple preselected countries;

input keys allowing operator from and into country input selections and numeric value selections; and a processor coupled to the multi-field reconfigurable display, to the memory, and to the operator input keys that is operable in program mode and in convert mode;

in said program mode, the processor (1) is operative to configure the multi-field reconfigurable display in said convert display mode, (2) is operative in response to operator numeric exchange rate information input to display said operator numeric exchange rate information in said from country numeric field and operative in response to operator from country information input to display said operator input from country information in said from country icon field and (3) is operative to program said data table in said memory in accord with the exchange rates of the countries input;

in said convert mode, the processor (1) is operative to configure the multi-field reconfigurable display in its program display mode, (2) is operative in response to operator from and into country information input to display the from country information in the from country icon field of the display, to display the into country information in the into country icon field of the display, (3) is operative in response to operator numeric value information input to display the number entered in the from country numeric field, which number represents the value of the goods or services to be converted, and (4) is operative to calculate and display the equivalent value of the number entered in the into country numeric field of the display.

2. The currency converter of claim 1, wherein said multi-field reconfigurable display is further configurable in a compute configuration mode to define calculator and numeric fields; wherein the input keys further include at least one of arithmetic function and memory function input keys; and wherein the processor is further operable in a compute mode; in said compute mode, the processor is operative to configure the multi-field reconfigurable display in said compute configuration mode defining calculator and numeric fields; is further operative in response to entering compute mode from convert mode to retain the value of the from numeric field in convert mode as operand in compute mode; and after at least one of arithmetic processing and memory function processing is performed in accord with at least one of operator arithmetic function and memory function information input, is operative to transfer the value in the numeric field in calculator mode into the from numeric field in convert mode, thereby seamlessly integrating calculator and convert mode functionality.

3. The currency converter of claim 1, wherein said multi-field reconfigurable display is further configurable in program configuration mode to define a reference country icon field, and wherein said processor is further operative in program mode to display a reference country icon in said reference country icon field.

4. A portable, battery-powered currency converter providing intuitive, substantially error-free, multiple single-currency conversions, comprising:

means for providing operator input designation of exchange rate, of amount and of country information;

a memory having a data table defining a plurality of predetermined foreign currencies;

means coupled to said memory and to said input means responsive to operator input of exchange rate information and of country information for programming, said data table defining a plurality of predetermined foreign currencies with the exchange rates of each of the countries input by the operator;

means coupled to said memory and to said input means responsive to operator input of a certain amount, of a certain currency in which the amount is specified, and of a certain currency in which the equivalent value of the certain amount is to be determined for calculating said equivalent value; and means coupled to the calculating means for displaying said certain amount input, an icon representative of the certain currency in which the amount is specified, said equivalent amount, and an icon representative of the certain currency in which the equivalent amount is specified, thereby providing intuitive, error-free, multiple, single-currency conversions.

5. The portable, battery-powered currency converter providing intuitive, substantially error-free, multiple single-currency conversions of claim 4, wherein said input designation providing means includes a keypad having numeric keys.

6. The portable, battery-power currency converter providing intuitive, substantially error-free, multiple single-currency conversions of claim 4, wherein said input designation providing means includes a keypad having FROM and INTO country scroll keys.

7. The portable, battery-powered currency converter providing intuitive, substantially error-free, multiple single-currency conversions of claim 4, wherein said displaying means concurrently displays said certain amount input, said icon representative of the certain currency in which the amount is specified, said equivalent amount, and said icon representative of the certain currency in which the equivalent amount is specified.

8. A portable, battery-powered currency converter providing intuitive, substantially error-free, multiple single-currency conversions exchange rate programming, comprising:

- means for providing operator input designation of exchange rate and of country information;
- a memory having a data table defining a plurality of predetermined foreign currencies;
- means coupled to said memory and to said input means responsive to operator input of exchange rate information and of country information for programming said data table defining a plurality of predetermined foreign currencies with the exchange rates of each of the countries input by the operator; and
- means cooperative with the programming means and coupled to the input means for displaying, for each of the countries designated by the operator, the exchange rate input and an icon representative of the currency in which the exchange rate is specified, thereby providing intuitive, substantially error-free, multiple single-currency conversions exchange rate programming.

9. The portable, battery-powered currency converter providing intuitive, substantially error-free, multiple single-currency conversions exchange rate programming of claim 8, wherein the displaying means further displays an icon representative of the reference currency with respect to which the exchange rates are specified.

10. The portable, battery-powered currency converter providing intuitive, substantially error-free, multiple single-currency conversions exchange rate programming of claim 8, wherein said input designation providing means includes a keypad having numeric keys.

11. The portable, battery-power currency converter providing intuitive, substantially error-free, multiple single-currency conversions exchange rate programming of claim 8, wherein said input designation providing means includes a keypad having a FROM country scroll key.

12. The portable, battery-powered currency converter providing intuitive, substantially error-free, multiple single-currency conversions exchange rate programming of claim 8, wherein said displaying means concurrently displays each said exchange rates input, and said icon representative of each said currency in which the exchange rates are specified.

13. A portable, battery-powered currency converter integrating at least one of arithmetic and calculator functions on amounts to be converted, comprising:

- converter means responsive to first information representative of an amount specified in one currency for converting the first information to second information representative of an equivalent amount specified in another currency; and
- calculator means coupled to the first means responsive to the first information for performing at least one of arithmetic and memory functions on the first information as operand to provide third information representative of the result of the at least one of said arithmetic and memory functions performed on the first information and for transferring the third information back to the converter means in such a way that the first information of the converter means is replaced by the third information, enabling the same to convert the first information as result to said second information representative of an equivalent amount specified in another currency.

14. The portable, battery-powered currency converter integrating at least one of arithmetic and calculator functions on amounts to be converted of claim 13, wherein said converter means includes a programmable data table of exchange rates of multiple foreign currencies.

* * * * *